July 4, 1944.  A. F. MESTON  2,352,651
MANUFACTURE OF ELECTRODES
Filed May 3, 1941  3 Sheets-Sheet 1
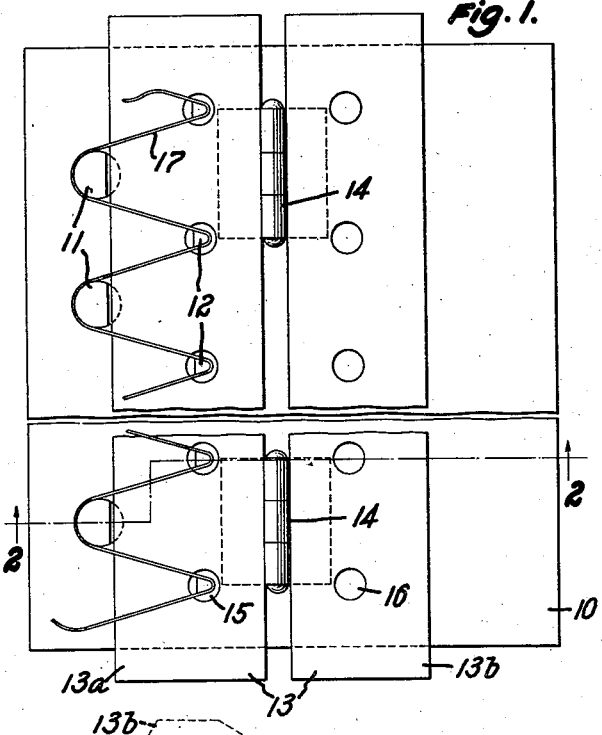
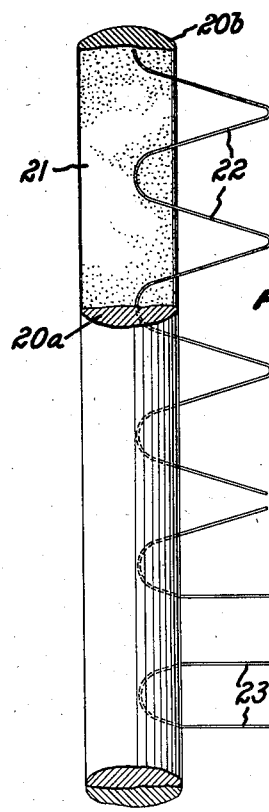
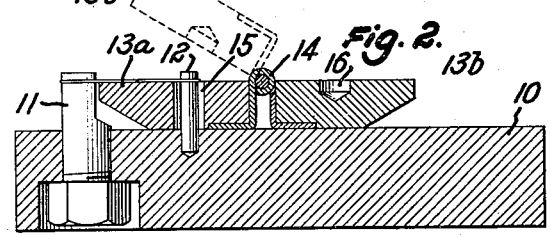
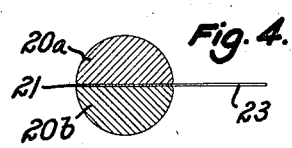
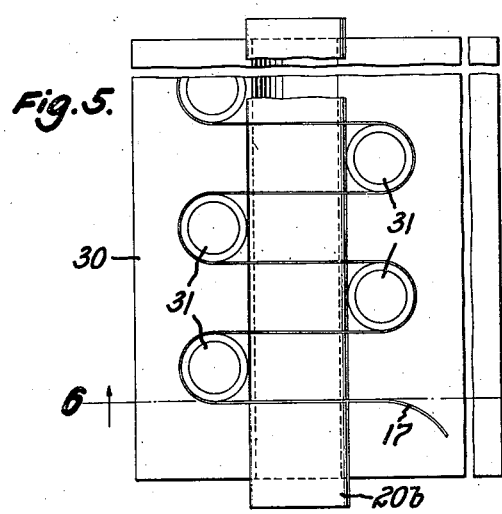
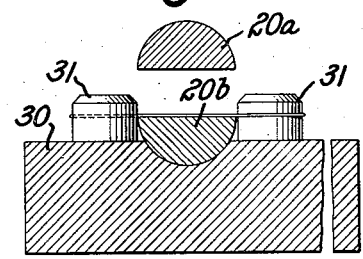
Inventor:
Archibald F. Meston
Pierce + Scheffler
Attorneys.

July 4, 1944. A. F. MESTON 2,352,651
MANUFACTURE OF ELECTRODES
Filed May 3, 1941 3 Sheets-Sheet 2
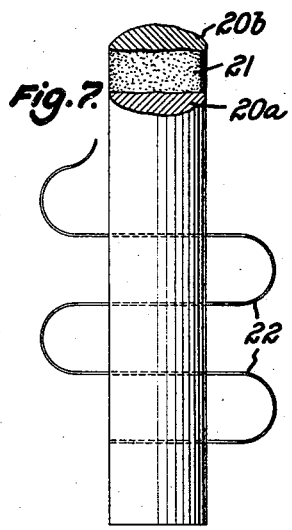
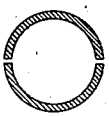
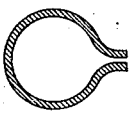
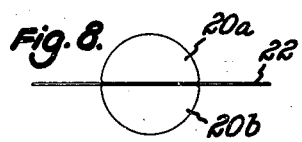
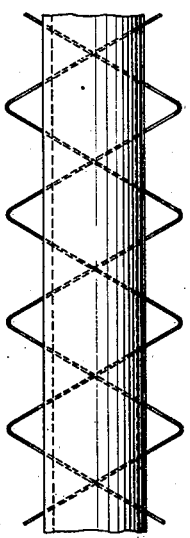
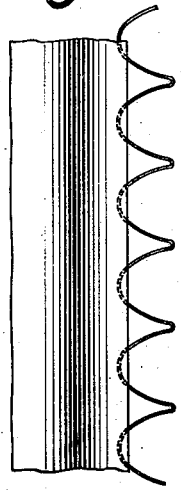
Inventor:
Archibald F. Meston
By Pierce & Scheffler
Attorneys.

July 4, 1944.　　　A. F. MESTON　　　2,352,651
MANUFACTURE OF ELECTRODES
Filed May 3, 1941　　　3 Sheets-Sheet 3
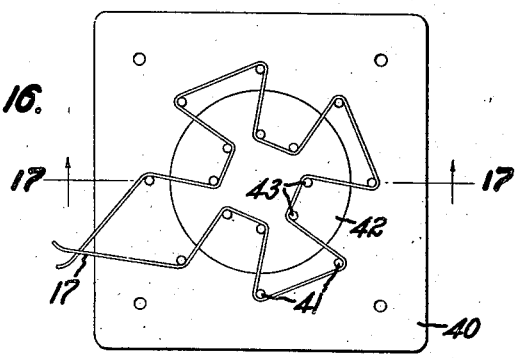
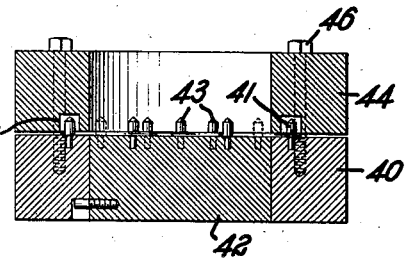
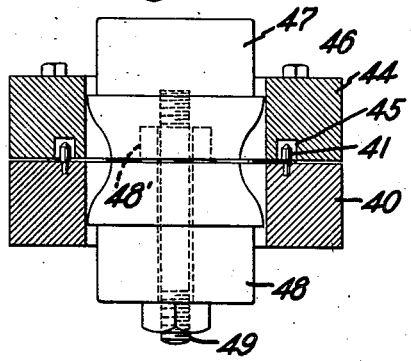
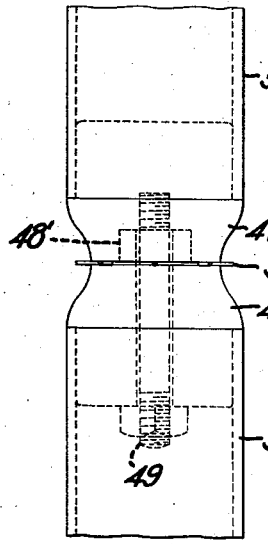
Inventor:
Archibald F. Meston
By Pierce & Scheffler
Attorneys.

Patented July 4, 1944

2,352,651

UNITED STATES PATENT OFFICE 2,352,651

MANUFACTURE OF ELECTRODES

Archibald F. Meston, Bound Brook, N. J., assignor to Research Corporation, New York, N. Y., a corporation of New York Application May 3, 1941, Serial No. 391,791

9 Claims. (Cl. 29—155.5)

This invention relates to the manufacture of electrodes and, more particularly, it relates to methods for the manufacture of composite electrodes particularly adapted for the electrical treatment of gases and comprising an extended surface non-discharging portion and a fine wire portion adapted to emit corona discharge under the influence of electric fields.

For certain purposes, and particularly when air or other gases are to be electrically treated for the removal of suspended particles with a minimum production of ozone or oxides of nitrogen, it has been found desirable to use very fine wires having diameters of the order of 0.01 inch and less for the production of corona discharge. I have found that an effective electrode may comprise an extended surface portion free from surface elements of radius of curvature small enough to produce corona discharge under operating conditions and a discharge surface portion of very small radius of curvature supported by the extended surface portion, the discharge surface portion extending from the extended surface portion to a distance preferably not exceeding the smallest radius of curvature of the extended surface portion adjacent the discharge surface portion and having an aggregate length at least a multiple of the projection distance, as described in my application Serial Number 391,789, filed herewith. In a preferred form of electrode the discharge surface portion comprises a plurality of fine wire members in the form of prongs or loops projecting from the extended surface.

The production of such electrodes in which the fine wire members consist of wire having diameters of the order of one-hundredth of an inch or less, for example, of tungsten wire 5 mils in diameter presents substantial difficulties.

A principal object of the present invention is to provide methods for the production of discharge electrodes of the type just described.

The method of the invention broadly comprises forming a fine wire into a plurality of looped portions to form a grid structure, engaging a portion of the grid structure between separable opposed interior surfaces of an extended surface member, for example, a longitudinally split rod, a tube longitudinally split along one or more radial planes or a rod or tube split at a right angle to the longitudinal axis thereof, while leaving a portion of the grid structure projecting from the extended surface member, and securing the opposed surfaces of the split extended surface member together in engagement with the grid structure therebetween. The opposed surfaces may be secured together by welding, which includes such methods as soldering, brazing and the like, by means of bolts, screws and the like, or by interlocking or frictional engagement of the opposed parts. The loops thus left extending in one or two directions from the surface of the joined extended surface member may be left as loops, which may be given any desired shape, or the loops may be cut and the wires straightened into prongs, for example, projecting perpendicularly from the surface of the supporting member. Two or more wire grid structures may be fastened in a single supporting member in the same or different planes.

The term "split" as applied to the extended surface supporting members is not intended to imply that these members are necessarily actually submitted to a splitting operation, as it may be desirable or preferable to fabricate the supporting member in the "split" form, for example, half round bars, tube halves or other suitable shapes as will hereinafter appear.

The wire grid structure is preferably formed by winding upon properly spaced pins and may be left upon the pins during the operation of securing the grid to the supporting member or the grid structure may be clamped in a suitable holding device and thereafter removed from the pins and positioned in proper relation to the opposed surfaces of the supporting member while in the holding device.

The invention will be more particularly described for the purpose of illustrating the principles thereof with reference to the accompanying drawings in which:

Fig. 1 is a fragmentary plan view of a device for forming and handling fine wire grid structures;

Fig. 2 is a section on line 2—2 of Fig. 1;

Fig. 3 is a fragmentary elevation in partial section of a discharge electrode in course of construction;

Fig. 4 is a cross-section of the electrode of Fig. 3;

Fig. 5 is a fragmentary plan view of a different form of device for forming and handling fine wire grid structures;

Fig. 6 is a section on line 6—6 of Fig. 5;

Fig. 7 is a fragmentary elevation in partial section of a discharge electrode produced with the device of Figs. 5 and 6;

Fig. 8 is an end view of the electrode of Fig. 7.

Figs. 9 to 12 are cross-sections of forms of split supporting members suitable for practicing the invention;

Figs. 13 to 15 are fragmentary views of various forms of electrodes which may be produced by the methods and devices of the invention;

Fig. 16 is a plan view of a further form of a device for forming and handling wire grid structures to be engaged in a diametrical plane of cylindrical rods or tubes;

Fig. 17 is a section on line 17—17 of Fig. 16;

Fig. 18 is a section on the same line as Fig. 17 showing the electrode portions in engaging relation to the grid structure; and Fig. 19 is a fragmentary view of the completed electrode structure.

In the device shown in Figs. 1 and 2, 10 is a base member bearing a row of forming pins 11, spaced from and symmetrically positioned with respect to, a further row of pins 12. 13a and 13b are the halves of clamp 13, which are connected by hinges 14. Clamp half 13a is pierced by holes 15, enabling it to fit loosely over pins 12, and the face of clamp half 13b is provided with pits 16 into which pins 12 may penetrate when the clamp is in closed position.

In the production of electrodes, the clamp 13 in open position is placed on base 10 with pins 12 in holes 15, as shown in Figs. 1 and 2. A fine tungsten wire 17 of, for example, 5 mils diameter, is wound in loops about pins 11 and 12 to form an elongated grid structure, as shown in the figures. The halves of the clamp are then closed and firmly fastened together by any suitable means (not shown). The clamp carrying the wire grid is then lifted away from the pins 11, 12 and the exposed portion of the grid is placed between the opposed surfaces of a split supporting member, for example, between the flat faces of half rounds 20a and 20b, as shown in Figs. 3 and 4. The opposing faces of the half round may advantageously be provided with a coating 21 of soldering or brazing composition, which upon heating the structure, either as a whole or locally, firmly welds the wire grid and the half rounds into permanent union.

The projecting loops 22 may be left as such or they may be cut and opened up to form prongs 23.

In the device shown in Figs. 5 and 6, 30 is a base member carrying two spaced rows of prongs 31, the rows being spaced apart at least by the width of a half portion of a split extended surface supporting member, such as half round 20b. The upper surface of base member 30 between the rows of pins 31 is advantageously shaped to provide a stable support for the half round or other portion of the supporting member.

In using the device, a half member 20b of the supporting member is placed on the base between the rows of pins with its outer surface down and a fine wire 17 is wound in loops about pins 31 to form an elongated wire grid resting upon the split surface of the half member. The complementary half member 20a is then placed on the wire grid with its flat surface contacting the grid. The two half members are then clamped together by suitable means (not shown) and the assembly is removed from the base and pins, as shown in Figs. 7 and 8. The two half members and enclosed wire grid are then permanently welded together, for example, by heating to melt a coating 21 of solder composition previously placed on the opposed surfaces of the opposed half members. After welding the projecting wire loops 22 may be formed into any desired shape or cut and opened up to form prongs.

In practicing the embodiment of the invention illustrated in Figs. 1 to 4, any of the forms of split supporting members shown in Figs. 9 to 12 may be used in place of the half rounds 20a and 20b, while the forms shown in Figs. 9 and 10 may also be used in practicing the embodiment of the invention illustrated in Figs. 5 to 8.

Various forms which the electrodes produced by the methods and devices of the invention may take are shown in Figs. 13, 14 and 15. In Fig. 13 the extended surface supporting member consists of a split tube of the form shown in Fig. 9. In Figs. 14 and 15 the supporting member comprises a lipped split tube of the form shown in Fig. 12.

The device shown in Figs. 16–18 is particularly adapted to the production of cylindrical rod or tube electrodes having fine wire elements projecting therefrom in a plane transverse to the longitudinal axis of the rod or tube. In the figures 40 is an annular base member having a central opening adapted to receive the split portions of the supporting member of the electrode. Base member 40 is provided with a plurality of upstanding pins 41 suitably spaced about the central opening. A central block 42 fits into the central opening of member 40, preferably with an easy sliding fit. It likewise bears upstanding pins 43, suitably positioned with respect to pins 41, so that a wire can be wound on said pins to form an annular grid. Cooperating with base member 40 is an annular clamp member 44 having a central opening corresponding to the central opening of the base member, and having its lower face provided with holes 45 adapted to receive freely pins 41. Suitable means, such as bolts 46, are provided for removably fastening members 40 and 44 together.

In the production of electrodes, central block 42 is placed in the opening of member 40 with pins 43 symmetrically positioned with respect to pins 41. A fine wire 17 is wound in loops about the pins to form an annular grid structure. Thereafter the outer portion of the annular grid structure is securely clamped by placing clamp member 44 upon base member 40, and fastening these members tightly together with bolts 46. The central block 42 is then removed and the inner portion of the annular grid structure is placed between the opposing surfaces of portions of an electrode supporting member, for example, complementary intermediate members 47, 48. The complementary members are then fastened tightly together, for example, by means of bolt 49, gripping the grid structure between their opposed surfaces, boss 48' assuring alignment of the members. The clamping members 40, 44 are then released and removed, and the exposed portions of the wire grid structure are cut and shaped into the desired shape and form, for example, short projecting prongs. The joined members 47, 48 may then be joined to tubular members 50, 51 to form an elongated electrode structure as having projecting fine wire prongs 52 as indicated in Fig. 19. The complementary portions of the electrode supporting member may, of course, be joined together in other suitable ways as by welding, screwing or merely by a friction fit.

If the prongs are to project from the supporting member at an angle, the opposing faces of members 40, 44 of the forming device may be conical, so that the grid structure formed therebetween lies on a conical surface.

It will be seen that the invention comprises a wide variety of forms and variations of construction and procedure within the scope defined in the appended claims.

I claim:

1. Method of producing a discharge electrode which comprises winding a fine wire having a diameter not exceeding about one-hundredth of an inch about a plurality of spaced supporting members to form a grid structure, engaging a portion of said grid structure while so supported between separable opposed interior surfaces of an extended surface member while leaving a portion of said grid structure projecting outward from said extended surface member, and securing said opposed surfaces of the extended surface member in engagement with the grid structure therebetween.

2. Method of producing a discharge electrode which comprises winding a fine wire having a diameter not exceeding about one-hundredth of an inch about a plurality of spaced supporting members to form a grid structure, engaging a portion of said grid structure while so supported between opposed surfaces of complementary portions of an extended surface member while leaving a portion of said grid structure projecting outward from said extended surface member, and securing said opposed surfaces of the extended surface member in engagement with the grid structure therebetween.

3. Method of producing a discharge electrode which comprises winding a fine wire having a diameter not exceeding about one-hundredth of an inch about a plurality of spaced supporting members to form a grid structure, engaging a portion of said grid structure while so supported between separable opposed interior surfaces of an extended surface member while leaving a portion of said grid structure projecting outward from said extended surface member, and welding said grid structure to said opposed surfaces of the extended surface member.

4. Method of producing a discharge electrode which comprises winding a fine wire having a diameter not exceeding about one-hundredth of an inch about a plurality of spaced supporting members lying substantially in a single plane to form an elongated grid structure, engaging a portion of said grid structure while so supported between separable opposed interior surfaces of an elongated extended surface member while leaving a portion of said grid structure projecting outward from said extended surface member, and welding said grid structure to said opposed surfaces of the extended surface member.

5. Method of producing a discharge electrode which comprises forming a fine wire into a plurality of looped portions to form a grid structure, engaging a portion of said grid structure between separable opposed interior surfaces of an extended surface member while leaving a portion of said grid structure projecting outward from said extended surface member, securing said opposed surfaces of the extended surface member in engagement with the grid structure therebetween, and thereafter cutting the projecting loops of said grid structure to form projecting prongs.

6. Method of producing a discharge electrode which comprises winding a fine wire having a diameter not exceeding about one-hundredth of an inch about a plurality of spaced supporting members lying substantially in a single plane to form an elongated grid structure, engaging a portion of said grid while so supported between opposed interior surfaces of a split rod while leaving a portion of said grid structure extending outward from said rod and welding said grid structure to said opposed surfaces of the split rod.

7. Method of producing a discharge electrode which comprises winding a fine wire having a diameter not exceeding about one-hundredth of an inch about a plurality of spaced supporting members lying substantially in a single plane to form an elongated grid structure, engaging a portion of said grid while so supported between opposed interior surfaces of a split tube while leaving a portion of said grid structure extending outward from said tube and welding said grid structure to said opposed surfaces of the split tube.

8. Method of producing a discharge electrode which comprises forming a fine wire having a diameter not exceeding about one-hundredth of an inch into a grid structure by winding the wire about a plurality of pins positioned in two spaced rows, engaging a portion of the grid structure while supported by said pins between separable opposed interior surfaces of an extended surface member, and securing said opposed surfaces of the extended surface member in engagement with the grid structure therebetween.

9. Method of producing a discharge electrode which comprises forming a fine wire into a grid structure by winding the wire about a plurality of pins positioned in two spaced rows, engaging a portion of the grid structure in a holding device, removing the grid structure in said holding device from said pins, engaging at least part of the unengaged portion of the grid structure between separable opposed interior surfaces of an extended surface member, and securing said opposed surfaces of the extended surface member in engagement with the grid structure therebetween.

ARCHIBALD F. MESTON.